United States Patent
Kawamura et al.

(10) Patent No.: US 7,296,467 B2
(45) Date of Patent: Nov. 20, 2007

(54) ANGULAR VELOCITY SENSOR

(75) Inventors: Toshiyuki Kawamura, Miyagi (JP); Yoshinori Satoh, Saitama (JP); Toru Matsunaga, Miyagi (JP); Takeshi Maeda, Miyagi (JP); Naoya Sasaki, Miyagi (JP); Kazuhiro Chiba, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/957,129

(22) Filed: Oct. 1, 2004

(65) Prior Publication Data

US 2005/0115318 A1    Jun. 2, 2005

(30) Foreign Application Priority Data

Oct. 9, 2003    (JP)    ............ P2003-351393

(51) Int. Cl.
*G01C 19/00*    (2006.01)
*G01P 15/08*    (2006.01)

(52) U.S. Cl. ................ 73/504.12; 73/504.14
(58) Field of Classification Search ............ 73/504.14, 73/504.12
See application file for complete search history.

(56) References Cited

U.S. PATENT DOCUMENTS

| | | | | |
|---|---|---|---|---|
| 5,765,046 A * | 6/1998 | Watanabe et al. | ............ | 396/53 |
| 5,794,080 A * | 8/1998 | Watanabe et al. | ............ | 396/53 |
| 5,824,900 A * | 10/1998 | Konno et al. | ............ | 73/504.16 |
| 6,116,086 A * | 9/2000 | Fujimoto | ............ | 73/504.14 |
| 6,119,519 A * | 9/2000 | Konno et al. | ............ | 73/504.16 |
| 6,237,415 B1 * | 5/2001 | Konno et al. | ............ | 73/504.16 |
| 6,288,478 B1 * | 9/2001 | Ishitoko et al. | ............ | 310/352 |
| 6,298,723 B1 * | 10/2001 | Konno et al. | ............ | 73/504.16 |
| 6,532,816 B2 * | 3/2003 | Fujimoto | ............ | 73/504.14 |
| 6,694,813 B2 * | 2/2004 | Koike | ............ | 73/504.14 |
| 6,807,716 B2 * | 10/2004 | Fujimoto | ............ | 29/25.35 |
| 7,111,511 B2 * | 9/2006 | Kawamura et al. | ............ | 73/504.12 |
| 7,111,512 B2 * | 9/2006 | Matsunaga et al. | ............ | 73/504.12 |
| 2005/0097954 A1 * | 5/2005 | Kawamura et al. | ............ | 73/504.02 |
| 2005/0146618 A1 * | 7/2005 | Matsunaga et al. | ............ | 348/208.1 |
| 2005/0188766 A1 * | 9/2005 | Matsunaga et al. | ............ | 73/504.14 |

* cited by examiner

*Primary Examiner*—Hezron Williams
*Assistant Examiner*—Samir M. Shah
(74) *Attorney, Agent, or Firm*—Sonnenschein Nath & Rosenthal LLP

(57) ABSTRACT

An angular velocity sensor 1 includes support members $10A_1$, $10A_2$, $10B_1$ and $10B_2$, bonded to two nodal points of a pillar-shaped oscillator, generated on oscillations of the oscillator, in a manner of sandwiching the nodal points from upper and lower sides of the oscillator. The support members simultaneously serve for mechanically supporting and providing for electrical connection of the oscillator. Upper support members $10A_1$, $10A_2$ and lower support members $10B_1$ and $10B_2$ for the nodal points include bent parts, the bent parts being bent in the same direction with respect to the longitudinal direction of the oscillator. The upper support members and lower support members also include arms 11 extending at right angles to the up-and-down direction and to the longitudinal direction of the oscillator and connecting portion 13 for the arms and the oscillator.

3 Claims, 15 Drawing Sheets

<COMPARISON OF PHYSICAL PROPERTIES OF MATERIALS>

| NAMES OF MATERIALS | DENSITY (g/cm3) | YOUNG'S MODULUS (GPa) | POISSON'S RATIO | HARDNESS HV | THERMAL EXPANSION COEFFICIENT ($10^{-7}$) | BENDING STRENGTH (MPa) |
|---|---|---|---|---|---|---|
| PZT (BZZ7M5MATERIAL) | 8.09 | 103 | 0.33 | 300 | 32-35 | 135 |
| AMORPHOUS CARBON | 1.46-1.60 | 30-33 | | 500 | 30 | 100-220 |
| GRAPHITE | 1.6 | 14 | | 150 | 32 | 40-90 |
| TITA-MAGNESIUM($MgTiO_3$) | 3.6 | 215 | | 630 | 134 | 265 |
| TITA-POTASSIUM($CaTiO_3$) | 4.2 | 260 | 0.33 | 900 | 110 | 274 |
| Mn-ZnFERRITE | 4.9 | 176 | 0.326 | 650 | 114 | 170 |
| 96%ALUMINA($Al_2O_3$) | 3.7 | 320 | 0.23 | 1370 | 72 | 350 |
| $Al_2O_3$-TiC | 4.24 | 392 | | 2000 | 78 | 835 |
| BRASS | 8.5 | 110 | 0.35 | | 170 | |

FIG.5

BONDING

SLICING OUT

ANGULAR VELOCITY SENSOR

BACKGROUND OF THE INVENTION

1. Field of the Invention

This invention relates to an angular velocity sensor, including support members, which are bonded to nodal points of a pillar-shaped oscillator, generated on oscillations thereof, and which may be used simultaneously for mechanically supporting and electrically connecting said oscillator.

This application claims priority of Japanese Patent Application No. 2003-351393, filed on Oct. 9, 2003, the entirety of which is incorporated by reference herein.

2. Description of Related Art

As angular velocity sensors for civil use, a so-called oscillation gyro type angular velocity sensor, in which bar-shaped oscillators are oscillated at a preset resonant frequency, and the Coriolis force, generated under the effect of the angular velocity, is detected by e.g. a piezoelectric device, to detect the angular angular velocity, is in widespread use.

In these angular velocity sensors, the oscillator shape maybe exemplified by a square pillar shaped vibrating reed. For supporting the vibrating reed, two nodal points of the oscillations may be supported by electrically conductive members.

FIG. 1 shows a method for supporting a conventional angular velocity sensor. In FIG. 1, a groove 95 is provided for extending longitudinally in a mid area along the width of a predetermined surface of an oscillator 96, formed of a piezoelectric material, thereby splitting the predetermined surface of the oscillator 96 into a surface area 91a and a surface area 91b. On the other hand, electrically conductive support members 40, 41 are mechanically and electrically connected to the oscillator 96 by connecting parts 40a, 41a, respectively. The connecting methods may be exemplified by solder connection or by electrically conductive adhesives.

With the above-described conventional angular velocity sensor, the oscillator 96 is oscillated by applying driving signals across the support members 40, 41. If the oscillator 96 is rotated about the longitudinal direction as an axis, the Coriolis force is generated, so that electrical signals of opposite polarities, proportionate to the Corilois force, are generated on the surface areas 91a, 91b of the oscillator 96. These electrical signals may be taken out from the support members 40 to detect angular angular velocity signals.

The support members 40, 41 must have two contradictory functions, that is, a function of restraining the nodal points of oscillation and a function of affording certain degree of freedom to the nodal points, in order to permit oscillations of the oscillator 96. If the restraint of the support members 40, 41 is strong, the amount of oscillations is decreased to lower the detection sensitivity for the angular velocity. If conversely the restraint is weak, the nodal points of oscillations are moved appreciably, thus presenting the problem of unstable characteristics.

If, with the recent tendency towards device size reduction, the support members 40, 41 are linear in shape, as shown in FIG. 1, the distance is shorter, as a matter of course, thus raising the twist resistance. Thus, such a technique is used which consists in bending the support members 50, 51 back and forth a plural number of times to lower the twist resitance, as shown in FIG. 2 (see, for example, Japanese Patent Publication H-10-332379).

On the other hand, an insert mold is used for securing a support member, in light of mass-producibility and cost reduction. With the insert mold, stationary positions of the upper and lower support members 50, 51 need to be shifted, because of the manufacture constraint, imposed on the insert mold. Thus, the upper and lower support members 50, 51 were necessarily arranged about the nodal points of the oscillation as axis.

However, in case the upper and lower support members 50, 51 are arranged symmetrically, as shown in FIG. 2, the space free of the support members in the vicinity of the oscillator 96 is decreased, thus worsening the assembly property, such as handling. This problem is felt more acutely as the device size is reduced.

On the other hand, if impact is applied from outside, the stress applied to the nodal points acts inversely at upper and lower points, because the upper and lower support members 50, 51 are arranged in the reverse directions, with the result that rotational moments are generated at the nodal points. Due to this rotational moment, there is raised a problem of destruction of the connection between the support members 50, 51 and the oscillator 96.

SUMMARY OF THE INVENTION

In view of the above-depicted problems of the prior art, it is an object of the present invention to provide an angular velocity sensor which is superior in impact-proofness and in assembling property.

According to the present invention, the upper and lower support members, sandwiching an oscillator from upper and lower sides, in a support structure of the oscillator, used e.g. in an angular velocity sensor of the vibrating reed type, are bent in the same direction, thereby achieving an angular velocity sensor superior in impact-proofness and in assembling performance.

An angular velocity sensor of the present invention comprises support means bonded to two nodal points of a pillar-shaped oscillator, generated on oscillations of the oscillator, in a manner of sandwiching the nodal points from upper and lower sides of the oscillator. The support means also serves for mechanically supporting and providing for electrical connection of the oscillator. Upper support members and lower support members of the support means with respect to the nodal points include bent parts. The bent parts are bent in the same direction with respect to the longitudinal direction of the oscillator. The Upper support members and lower support members of the support means also include arms extending at right angles to the up-and-down direction and to the longitudinal direction of the oscillator, and junction parts for connecting the arms to the oscillator.

With the angular velocity sensor of the present invention, in which the upper and lower support members are arranged at substantially the same positions, the free space about the oscillator is appreciably increased as compared to that in the conventional system. This improves the handling properties and ease in operation during the assembling process to lower the production process. Moreover, further reduction in the device size may be possible.

In addition, circuit components, such as chip components, may be provided in the increased space, thereby enabling device integration.

Since the upper and lower support members are bent in the same direction and mounted facing each other, no rotational moment is applied to the nodal points of the oscillations, in case a force of impact is applied from outside, thus assuring impact proofness which is superior to that in case the upper and lower support members are arranged in the opposite directions to each other.

The present invention is not limited to an angular velocity sensor of the vibrating reed type and may be applied to devices employing an oscillator which is in need of support members.

BRIEF DESCRIPTION OF THE DRAWINGS

FIG. 1 shows an example of a conventional angular velocity sensor, in which

FIG. 2 shows an example of a conventional angular velocity sensor, in which

FIG. 5 shows the results of comparison of physical properties of various materials.

DESCRIPTION OF THE PREFERRED EMBODIMENTS

Figure 1A:
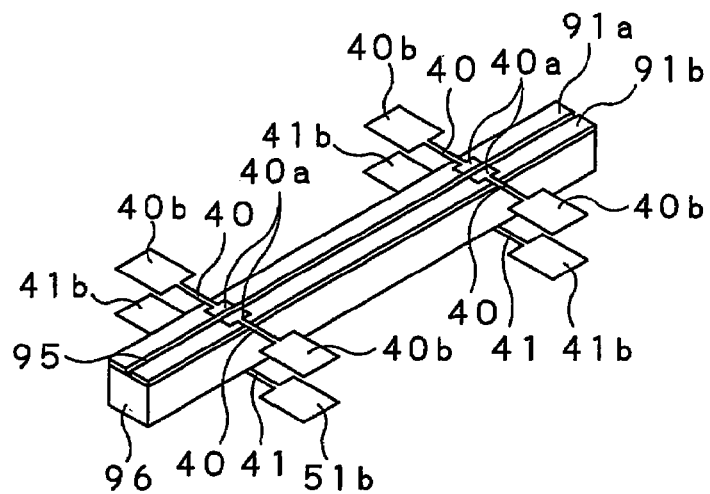
FIG. 1A, FIG. 1B and FIG. 1C are a perspective view, a perspective view from above, and a perspective view from below, showing an oscillator part of a conventional angular velocity sensor, respectively.
Figure 1B:
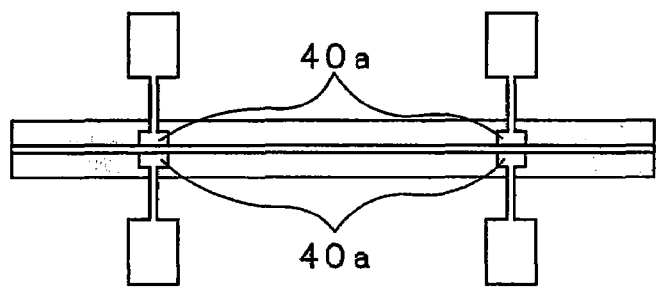
Figure 1C:
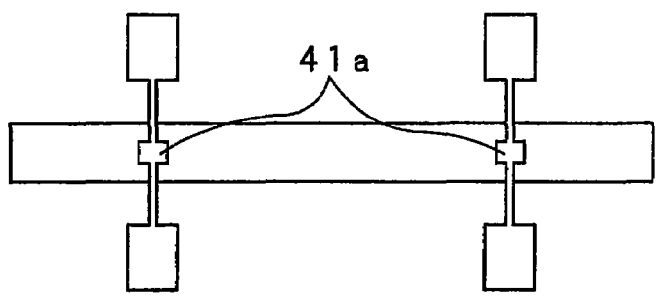
Figure 2A:
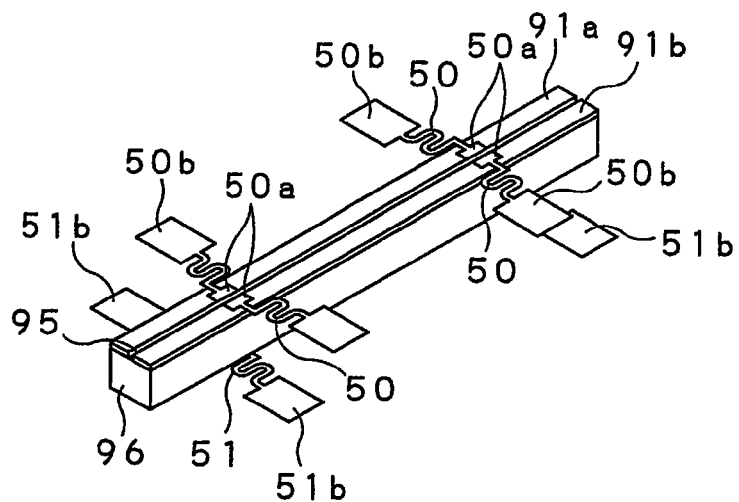
FIG. 2A, FIG. 2B and FIG. 2C are a perspective view, a perspective view from above, and a perspective view from below, showing an oscillator part of another conventional angular velocity sensor, respectively.
Figure 2B:
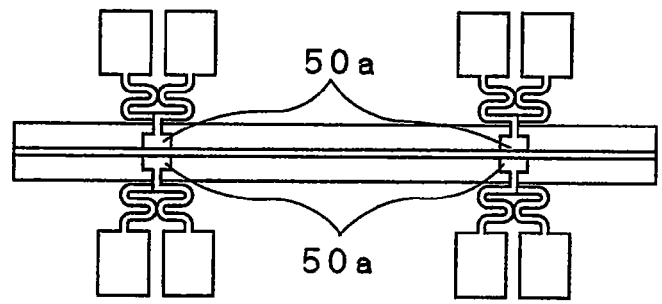
Figure 2C:
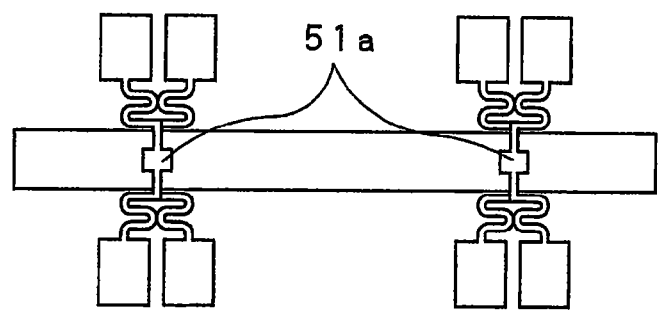

Referring now to the drawings, certain preferred embodiments of the present invention are explained in detail. It is noted that the present invention is not limited to the embodiments as now explained, and may optionally be modified without departing from the scope of the invention.

Figure 3:
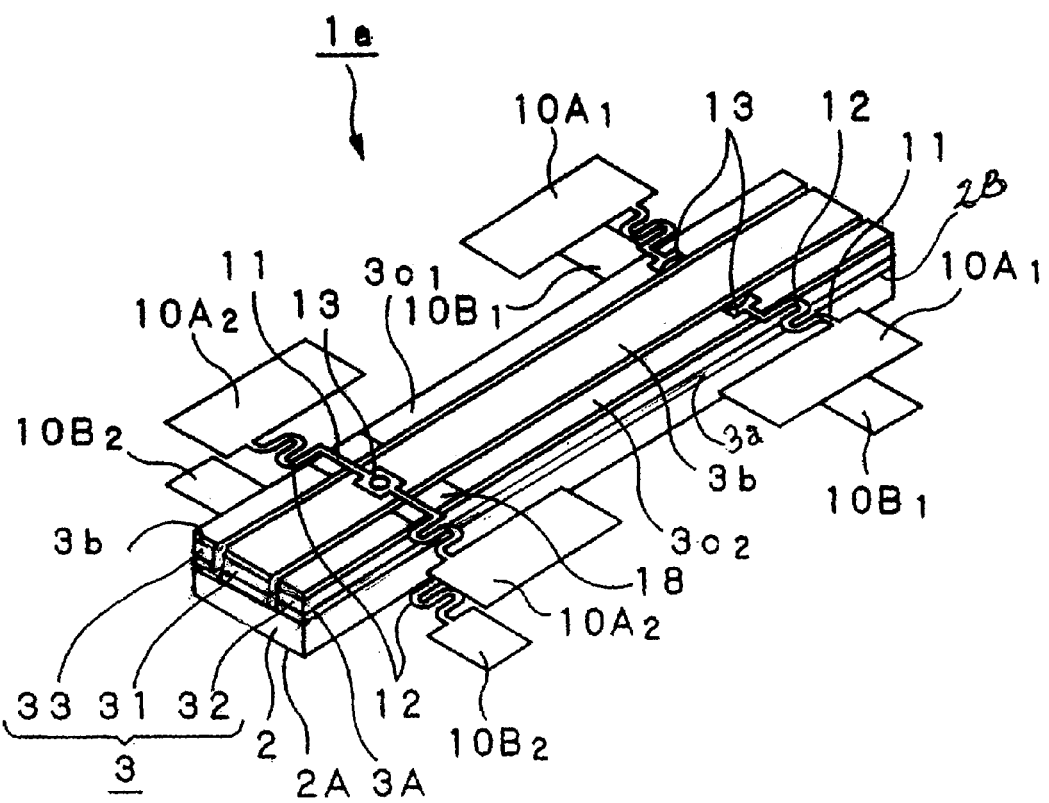
FIG. 3 is a perspective view showing an oscillator provided to an angular velocity sensor embodying the present invention.
Figure 4:
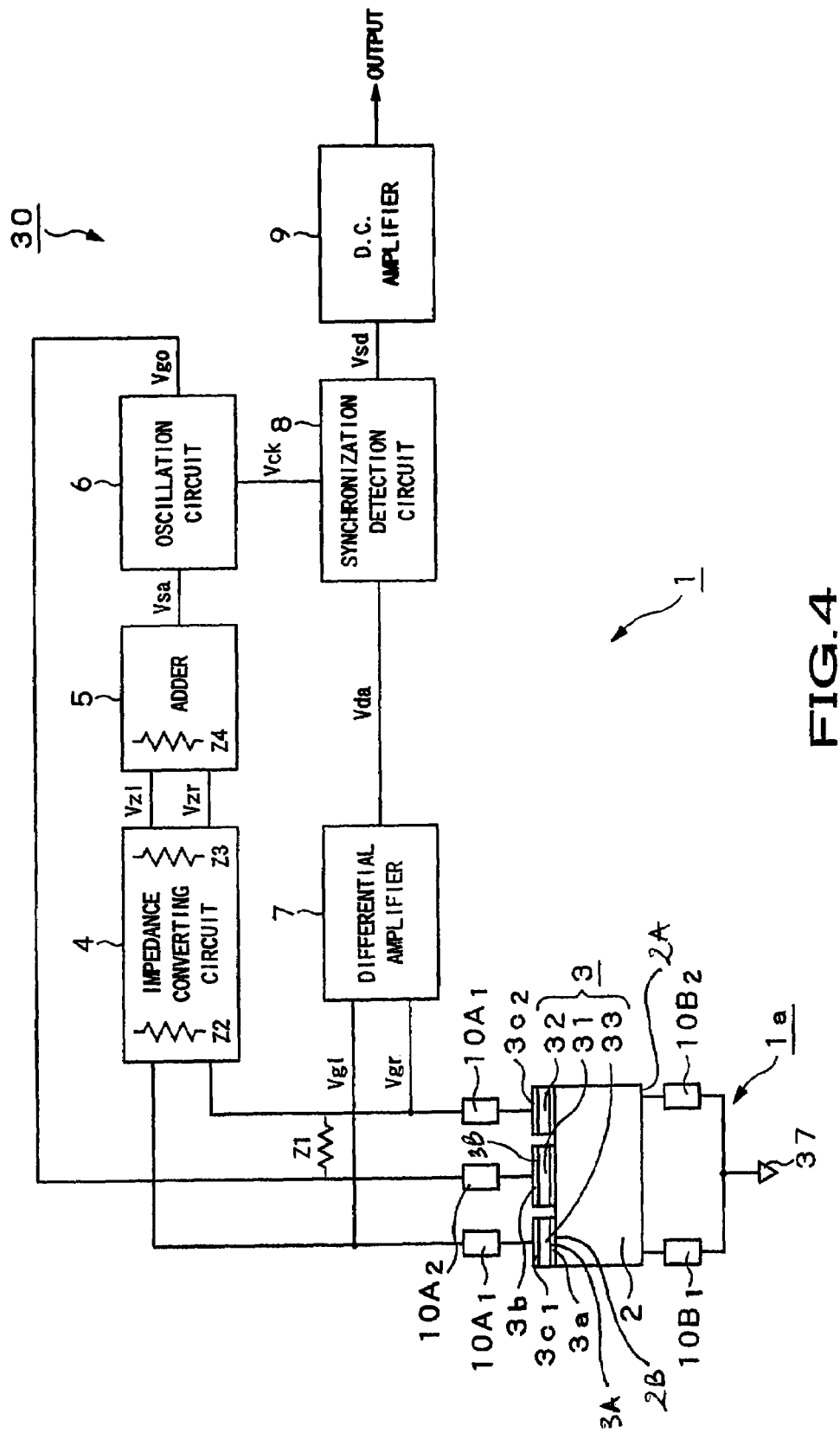
FIG. 4 is a block diagram showing an example of a circuit for employing the angular velocity sensor.

FIG. 3 is a perspective view of an angular velocity sensor 1, embodying the present invention, and FIG. 4 is a block diagram showing an embodiment of a driving detection circuit 30 for employing the angular velocity sensor 1.

Referring to FIG. 3 and FIG. 4, the angular velocity sensor 1 of the present embodiment includes an oscillator 1a, operating as an oscillation gyroscope.

Figure 13:
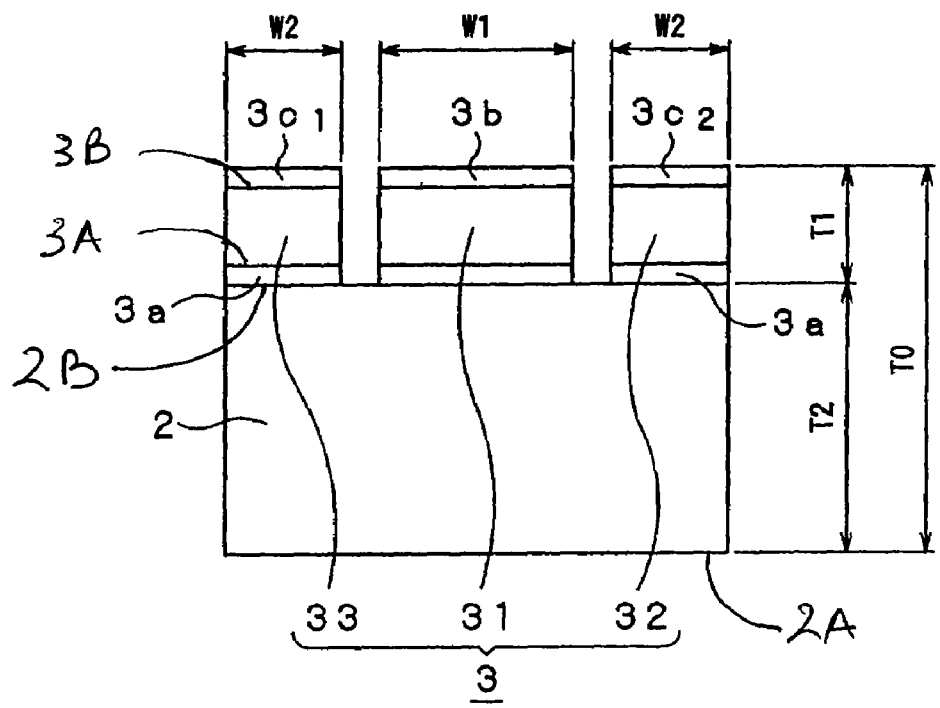
FIG. 13 is a cross-sectional view of the oscillator in the angular velocity sensor.

Referring to FIG. 3 and FIG. 13, the oscillator 1a is composed of a substrate 2 and a piezoelectric member 3, layered together, and is formed to a square pillar shape having a rectangular cross-section as taken along the plane perpendicular to the longitudinal direction, referred to below simply as the cross-section.

This piezoelectric member 3 of the oscillator 1a is formed of piezoelectric ceramics, mainly composed of PZT (lead zirconate titanate), and is usually generated by polarization processing. A reference electrode 3a is formed on one 3A of the major surfaces of the piezoelectric member 3 facing each other. This major surface 3A, carrying the reference electrode, is the surface to be bonded to the substrate 2. On the opposite side major surface 3B of the piezoelectric member 3, a driving electrode 3b and a pair of detection electrodes 3c1, 3c2 are arranged parallel to one another along the longitudinal direction of the oscillator 3. The detection electrodes are separated from each other and extend with the driving electrode 3b in-between. The portion of the piezoelectric member carrying the driving electrode 3b operates as a piezoelectric device for driving 31, while the portions of the piezoelectric member carrying the detection electrodes 3c1, 3c2 operate as piezoelectric devices for detection 32, 33. (This is shown best in FIG. 13 where a cross sectional view is illustrated.)

The substrate 2 of the present oscillator 1a is formed of a material, which differs from PZT, and which has a Young's modulus and a thermal expansion coefficient equivalent or less than those of PZT, as the main component of the piezoelectric ceramics of the piezoelectric member 3, such as ceramic materials, mainly composed of carbon, such as amorphous carbon or graphite.

The results of comparison of the physical properties of the various materials are as shown in FIG. 5, from which it is seen that, while the PZT (BZ27M5 material), as the main component of the piezoelectric ceramics, has the Young's modulus of 103 GPa and a thermal expansion coefficient of $32 \times 10^{-7}$ to $35 \times 10^{-7}$ the amorphous carbon has the Young's modulus of 30 to 33 GPa and a thermal expansion coefficient of $30 \times 10^{-7}$ to $35 \times 10^{-7}$, and the graphite has the Young's modulus of 14 GPa and a thermal expansion coefficient of $32 \times 10^{-7}$. Thus, the ceramics material, mainly composed of carbon, such as amorphous carbon or graphite, has physical properties, such as Young's modulus or thermal expansion coefficient, equal or less than those of PZT, as the main component of the piezoelectric ceramics.

With this angular velocity sensor 1, the piezoelectric member 3 is thinner in thickness than the substrate 2. For example, the thickness of the piezoelectric member 3 and that of the substrate 2 are set to 0.2 mm and 0.8 mm, respectively.

The oscillator 1a in the form of the square pillar is carried by support members $10A_1$, $10A_2$, $10B_1$ and $10B_2$, which are bonded to two nodal points of the oscillator, generated on oscillations, for sandwiching these nodal points from the vertical direction. The node parts of the oscillator, generated at the time of oscillations, operate as mechanical support and the electrical connection portions.

The support members $10A_1$, $10A_2$, $10B_1$ and $10B_2$ are formed e.g. of bronze or stainless steel. The support members $10A_1$, $10A_2$ overlying the nodal points and the support members $10B_1$, $10B_2$ underlying the nodal points, each include an arm 11, including bent parts 12, and a connecting portion 13 interconnecting the arm 11 and the oscillator 1a. These parts 12 are bent in the same direction relative to the longitudinal direction of the oscillator 1a. Each arm 11 extends in a direction perpendicular to the up-and-down direction and the longitudinal direction of the oscillator 1a. The upper support member $10A_1$ has the connecting portion 13 bonded to the paired detection electrodes 3c1, 3c2 at the nodal point of the oscillations of the oscillator 1a, while the support member $10A_2$ has the connecting portion 13 bonded to the driving electrode 3b at the nodal point of the oscillations of the oscillator 1a. In an area of the piezoelectric member where the support member $10A_2$ bonded to the driving electrode 3b straddles the detection electrodes 3c1, 3c2, the detection electrodes 3c1, 3c2 are partially removed to provide an insulator 18, so that the arm 11 of the support member $10A_2$ is not contacted with the detection electrodes 3c1, 3c2.

As for the lower support members $10B_1$ and $10B_2$, the connecting portion 13 is bonded to the substrate 2 of amorphous carbon, at the nodal point of oscillations of the oscillator 1a, and is thereby electrically connected, via the substrate 2, to the reference electrode 3a.

The piezoelectric member 3 of the angular velocity sensor 1 also has the function of producing oscillations and the function of detecting the oscillations. Thus, the angular velocity sensor 1 detects the Coriolis force, generated by rotation of the oscillator 1a during the oscillations by the function of producing the oscillations.

That is, the angular velocity sensor 1 applies the voltage across the reference electrode 3a provided to the major surface 3A of the piezoelectric member 3 of the oscillator 1a, obtained on layering the substrate 2 and the piezoelectric member 3 together, and the driving electrode 3b, provided to the other major surface 3B, to cause oscillations of the oscillator 1a and detect the Coriolis force generated in the oscillator 1a to output an angular velocity detection signal as a signal corresponding to the Coriolis force from the detection electrodes 3c1, 3c2 provided to the opposite major surface 3B.

The oscillator 1a of the angular velocity sensor 1 is coupled to the driving detection circuit 30 via support members $10A_1$, $10A_2$ as shown in FIG. 4. The connecting portion 13 becomes the nodal point of oscillations of the oscillator 1a, oscillated in resonation by this driving detection circuit 30, such that the oscillator 1a is oscillated in resonation with the axial ends thereof as free ends.

With the present angular velocity sensor 1, in which the upper and lower support members $10A_1$, $10A_2$, $10B_1$ and $10B_2$ are arranged at substantially the same position, the free space about the oscillator 1a may be appreciably increased as compared to that of the conventional system. This improves the handling property and ease in operation during assembling, thereby reducing the manufacture cost. Moreover, circuit components, such as chip components, may be arranged in the increased space, thus assuring facilitated device integration. If a force of impact is applied from outside, the upper and lower support members $10A_1$, $10A_2$, $10B_1$ and $10B_2$ are arranged facing each other for flexing in the same direction, such that no rotational moment is applied to the nodal points of oscillations, thus assuring improved shock-proofness as compared to the case in which the upper and lower support members $10A_1$, $10A_2$, $10B_1$ and $10B_2$ are arranged facing each other for flexing in the opposite directions.

Figure 6:
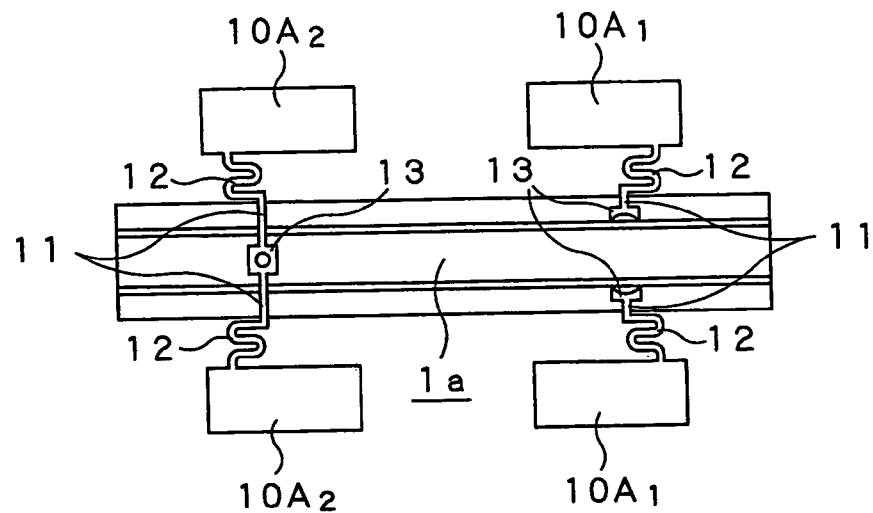
FIG. 6 is a perspective view showing the oscillator provided to an angular velocity sensor, looking from an upper side.
Figure 7:
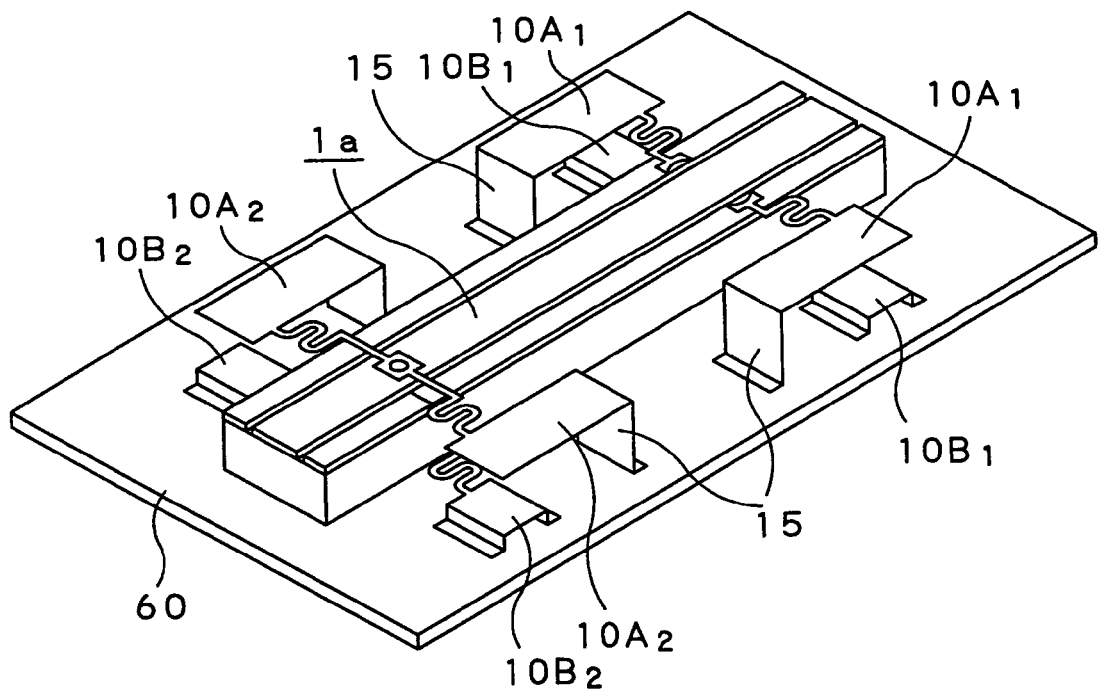
FIG. 7 is a perspective view showing the state in which the angular velocity sensor has been directly mounted on a substrate without using components such as insert mold.

Meanwhile, although the upper support members $10A_1$, $10A_2$, and the lower support members $10B_1$ and $10B_2$ are arranged in vertically superposed relation to each other, as shown in FIG. 6, connection to the insert mold may be achieved unobjectionably by enlarging the shape of the stationary portions of the upper support members $10A_1$, $10A_2$. In addition, the angular velocity sensor may directly be mounted on the support 60 without using components such as insert mold, by bending and elongating the upper support members $10A_1$, $10A_2$, and by providing a connection part 15 for a support 60 on these support members $10A_1$, $10A_2$, as shown in FIG. 7.

Figure 8D:
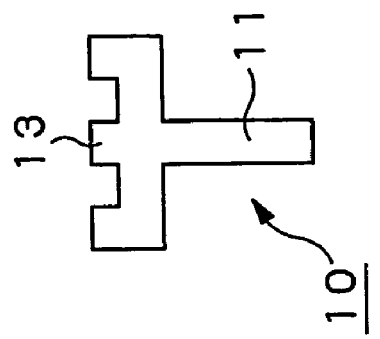
FIG. 8 is a schematic plan view showing a typical shape of a connecting part of a support member for the oscillator in the angular velocity sensor.
Figure 8C:
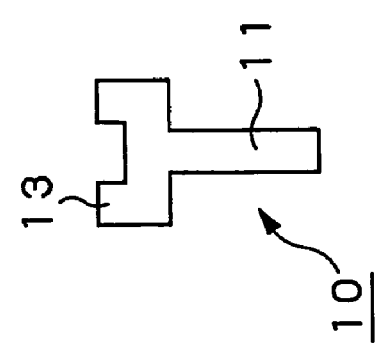
Figure 8B:
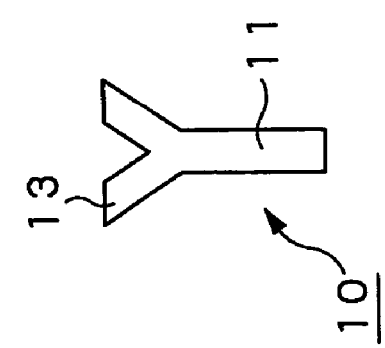
Figure 8A:
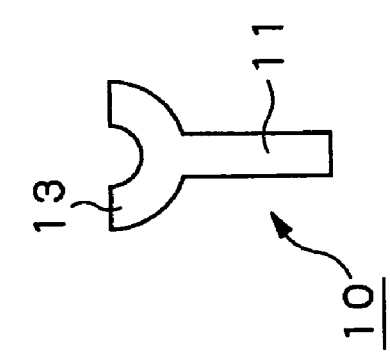

The connecting portion 13 on the distal end of the arm 12 is bifurcated, so that the solder or an electrically conductive adhesive is intruded into the space defined between the bifurcated portions to achieve a high mechanical strength. If, with the size reduction of the oscillator 1a, the connecting portion 13 is reduced in size, the mechanical connection strength may be increased in case the connecting portion 13 is semi-circular, as shown in FIG. 8(A), rather than circular in profile, for a limited space, since then the radius of the inner circle may be larger. In case the connecting portion 13 is furcated in three or more branches, similar effects may be achieved with a Y-shape shown in FIG. 8(B), a U-shape as shown in FIG. 8(C) or a tri-furcated shape, as shown in FIG. 8(D).

Referring to FIG. 4, the driving detection circuit 30 includes an impedance converting circuit 4 and a differential amplifier 7, connected to the detection electrodes 3c1, 3c2 of the oscillator 1a via support member $10A_1$, an adder 5 connected to the impedance converting circuit 4, an oscillation circuit 6, connected to the adder 5, a synchronization detection circuit 8, connected to the oscillation circuit 6 and to the differential amplifier 7, and a d.c. amplifier 9, connected to the synchronization detection circuit 8. An output of the oscillation circuit 6 is coupled to the driving electrode 3b via support member $10A_2$. The reference electrode 3a of the oscillator 1a is electrically connected to the substrate 2, formed of amorphous carbon, and is connected to a reference potential 37 via support members $10B_1$ and $10B_2$.

With the present driving detection circuit 30, the oscillator 1a is oscillated by a free oscillation circuit, formed by the oscillator 1a, impedance converting circuit 4, adder 5 and the oscillation circuit 6, and is warped and oscillated in a direction perpendicular to the forming surface of the piezoelectric device for driving 31, used as a driving member.

That is, the oscillator 1a is driven by an oscillation output Vgo of the oscillation circuit 6 being supplied to the piezoelectric device for driving 31. An output Vgl of the piezoelectric device for detection 32 for the oscillator 1a and an output Vgr of the piezoelectric device for detection 33 are entered via impedance converting circuit 4 to the adder 5 as Vzl, Vzr. An addition output Vsa by this adder 5 is fed back to the oscillation circuit 6.

If, in this state, the oscillator 1a is rotated about its long axis, the direction of warping and oscillations is changed by the Coriolis force. Hence, an output differential Vgl-Vgr is generated between the piezoelectric devices for detection 32 and 33 to generate an output Vda from the differential amplifier 7. The signal for driving the oscillator 1a at this time is the output of the piezoelectric devices for detection 32 and 33 for the standstill time and is a signal which is in phase and of the same magnitude for the piezoelectric devices for detection 32 and 33. Hence, the signals for actuating the oscillator 1a are counterbalanced by the differential amplifier 7. The signals by the Coriolis force are signals Vcl, Vcr, which are antiphase and of the same magnitude in the piezoelectric devices for detection 32 and 33. Hence, the output Vda of the differential amplifier 7 is proportionate to Vcl-Vcr.

The output Vda of this differential amplifier 7 is subjected to synchronous detection by the synchronization detection circuit 8 and thereby converted into a d.c. signal Vsd. This d.c. signal Vsd is obtained by full-wave rectifying the output Vda of the differential amplifier 7 at a timing of the clock signal Vck, output in synchronism with the driving signal by the oscillation circuit 6, and by integrating the full-wave rectified signal. This signal Vsd may be d.c. amplified by the d.c. amplifier 9 to a predetermined magnitude to detect only an angular velocity signal produced by rotation.

The impedance converting circuit 4 has a high impedance Z2 at an input and a low impedance Z3 at an output, and is used for separating an impedance Z1 across the piezoelectric devices 32, 33 and an impedance Z4 across the inputs of the adder 5. Assuming that the impedance converting circuit 4 is not provided, the impedance Z1 across the piezoelectric devices 32, 33 and an impedance Z4 across the inputs of the adder 5 are not separated from each other, such that the output difference produced across the piezoelectric devices 32, 33 is the above output difference multiplied by Z4/(Z1+Z4), thus being smaller than the value when there is provided the impedance converting circuit.

The impedance converting circuit 4 simply converts the impedance across the input and the output and does not affect the signal magnitude. Hence, the output Vgl of the piezoelectric device 32 is of the same magnitude as one output Vzl of the impedance converting circuit 4, such that the output Vgr of the piezoelectric device 33 is of the same magnitude as the other output Vzr of the impedance converting circuit 4. Thus, with the output Vsa of the adder 5, the signal conforming to the Coriolis force is counterbalanced, such that the output is the sum of the outputs of the piezoelectric devices 32, 33 for standstill time. The positive feedback loop by the adder 5, oscillator 1a, impedance converting circuit 4 and the oscillation circuit 6 make up an oscillation circuit and is subjected to self-excited oscillations at the resonant frequency of the oscillator 1a.

If an output voltage of a switching regulator, produced with the oscillation frequency not less than hundreds of kHz, is supplied to the power supply of the driving detection circuit 30, the power supply noise also appears across the two outputs of the impedance converting circuit 4, thus proving a signal noise. If, in this case, the power supply noise appears in a differential fashion in the two outputs of the impedance converting circuit 4, there is produced a potential difference, ascribable to the noise, across the two outputs Vzl and Vzr. The two outputs Vzl and Vzr of the impedance converting circuit 4, corrupted by the signal noise, are summed by the adder 5 and supplied to the oscillator 1a through the oscillation circuit 6.

As a matter of course, the aforesaid signal noise is superposed on the output Vgo of the oscillation circuit 6. However, since the oscillator 1a operates similarly to a bandpass filter, and hence the frequency components different than the resonant frequency of the oscillator 1a are removed. Thus, with the present driving detection circuit 30, the output of the piezoelectric devices 32, 33 is freed of the aforementioned signal noise, so that the aforementioned signal noise is not contained in the output Vda, and hence is not affected by the power supply noise.

Figure 9A:
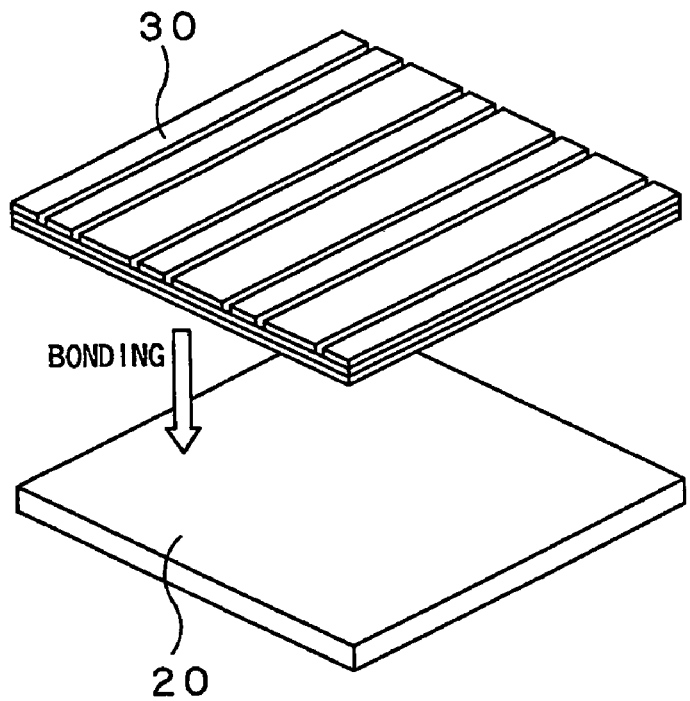
FIG. 9 shows an example of the method for manufacturing the angular velocity sensor.
Figure 9B:
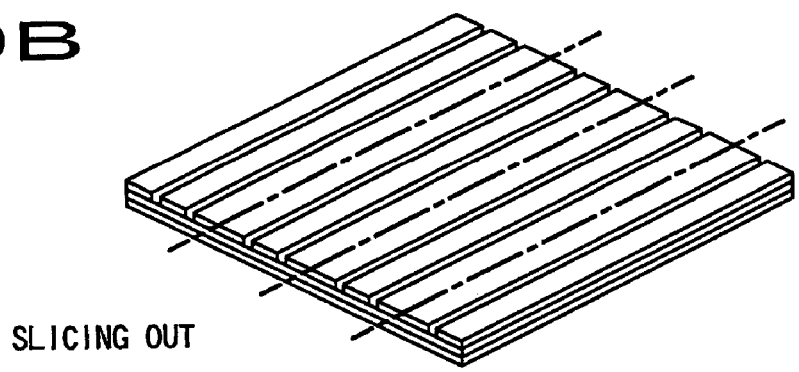
Figure 9C:
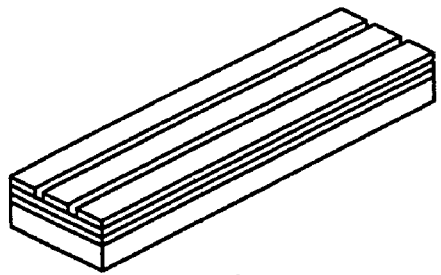

Moreover, in the present embodiment, since the detection electrodes 3c1, 3c2 and the driving electrode 3b are arranged on the same surface of the angular velocity sensor 1, the oscillator 1a may be produced, as shown in FIG. 9(C), by stacking a wafer 20, as a substrate matrix, and a wafer 30, as a matrix of the piezoelectric material, as shown in FIG. 9(A), bonding these wafers together, and slicing out square-shaped pillars from the so bonded wafers, as shown in FIG. 9(B). The wafer 30 is subjected to electrode plating on both sides thereof, before being bonded to the wafer 20, to form respective electrodes thereon. The oscillator 1a, produced by the above process, is extremely high in precision and may be produced to an extremely small size, while mass-producing effects may also be achieved. Additionally, the problem of non-alignment in the bonding position may be overcome. Moreover, the substrate exhibits machining performance comparable to that of the piezoelectric material, thus assuring facilitated slicing out of the oscillator from the substrate wafer and the piezoelectric wafer, as described above.

There is also no necessity of providing the steps difficult to perform, such as bonding piezoelectric devices to the elastic metal oscillators or printing the electrodes on the curved surfaces.

With the present angular velocity sensor 1, the substrate 2, bonded to the reference electrode 3a, formed on one 3A of the major surfaces of the piezoelectric member 3, is formed of an electrically conductive material. It is also possible that the substrate 2, formed of an insulating material, is plated with an electrically conductive material, and an electrode, electrically connected to the reference electrode 3a, is formed on the two major surfaces 2A, 2B of the substrate 2 facing the major surface 3A of the piezoelectric member 3, and at least one lateral surface thereof contiguous to the two major surfaces 2A, 2B, thereby enabling a driving electrical field to be applied efficiently to the piezoelectric member 3 to improve the sensitivity.

Although it may be contemplated that technical difficulties are enhanced with reduction in device size to render it difficult to achieve the precision, this problem may be addressed by applying the ultra-fine processing technique already established in the field of the LSI or head machining. Since the high dimensional accuracy may be achieved, it is possible to simplify the frequency adjustment of the oscillator.

In addition, by applying the self-excited oscillation type driving circuit, the angular velocity sensor 1 of a high accuracy may be achieved by an extremely simplified circuit.

Since the present angular velocity sensor 1 is of the self-excited oscillation type, there is no risk that the sensitivity of the sensor is lowered under the effect of temperature characteristics, as in the case of the separately excited angular velocity sensor.

Figure 10:
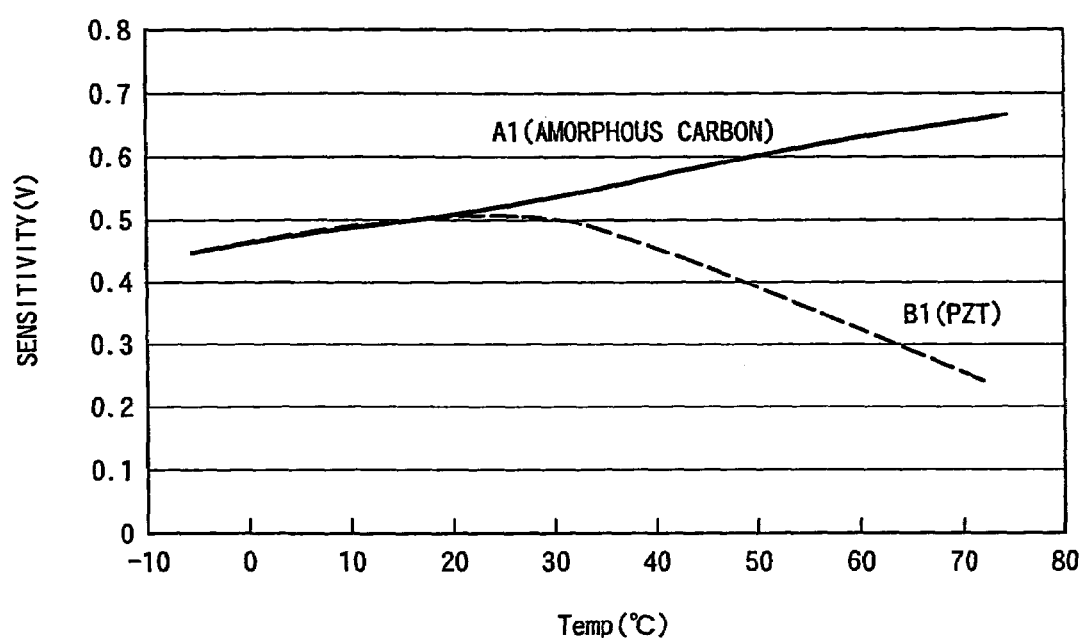
FIG. 10 is a graph showing measured results of sensitivity change characteristics against changes in the environmental temperature of the angular velocity sensor.

FIG. 10 shows measured results of sensitivity change characteristics against changes in the environmental temperature of the angular velocity sensor 1. In FIG. 10, characteristics A1 denote characteristics of the angular velocity sensor 1 in case the substrate 2 is formed of a material (amorphous carbon) having the Young's modulus and the thermal expansion coefficient equivalent or less than those of PZT, as a main component of the piezoelectric ceramics, making up the piezoelectric member 3, whilst characteristics B1 denote characteristics of the angular velocity sensor 1 in case the substrate 2 is formed of PZT.

As may be seen from this FIG. 10, the oscillator 1a may be constructed which is less susceptible to changes in the environmental temperature by forming the substrate 2 of a material (amorphous carbon) having the Young's modulus and the thermal expansion coefficient equivalent or less than those of PZT, as a main component of the piezoelectric ceramics making up the piezo electric member 3.

Figure 11:
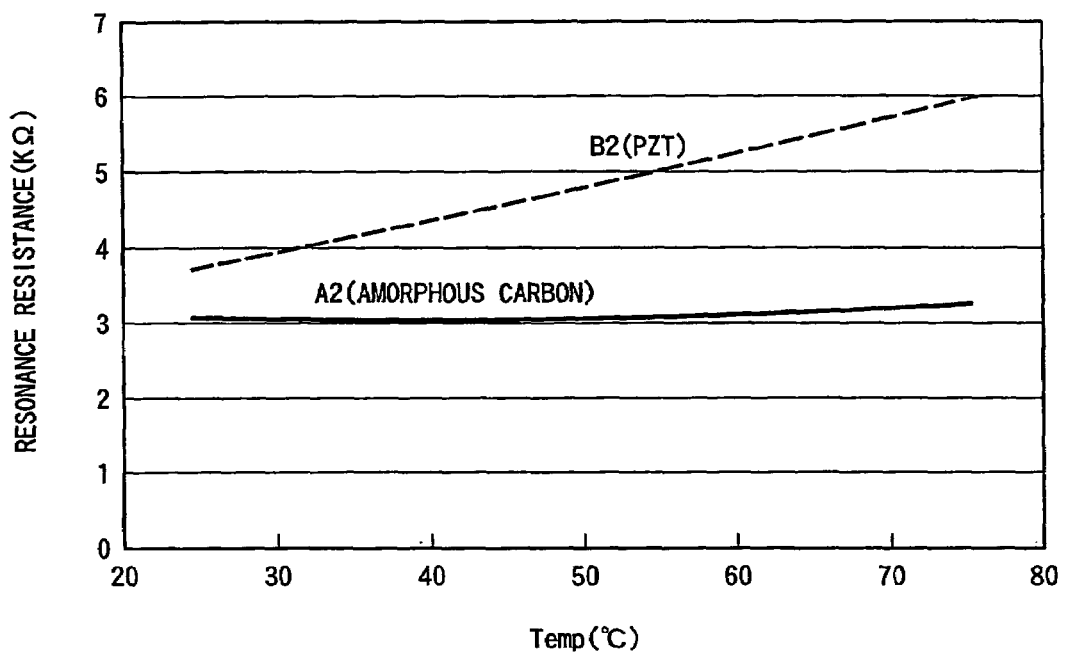
FIG. 11 is a graph showing the temperature dependency of the resonation resistance/sensor sensitivity of the oscillator per se in the angular velocity sensor.

Moreover, with the present oscillator 1a, changes with temperature of the resonant resistance of the oscillator per se may be lower, as shown by characteristics A2, shown in FIG. 11, than those in case the substrate is formed of PZT, as shown by characteristics B2, as a result of which the changes with temperature of the detection sensitivity of the angular velocity sensor are diminished. In addition, the correction may be facilitated, because the mode of the changes with temperature is linear.

Figure 12:
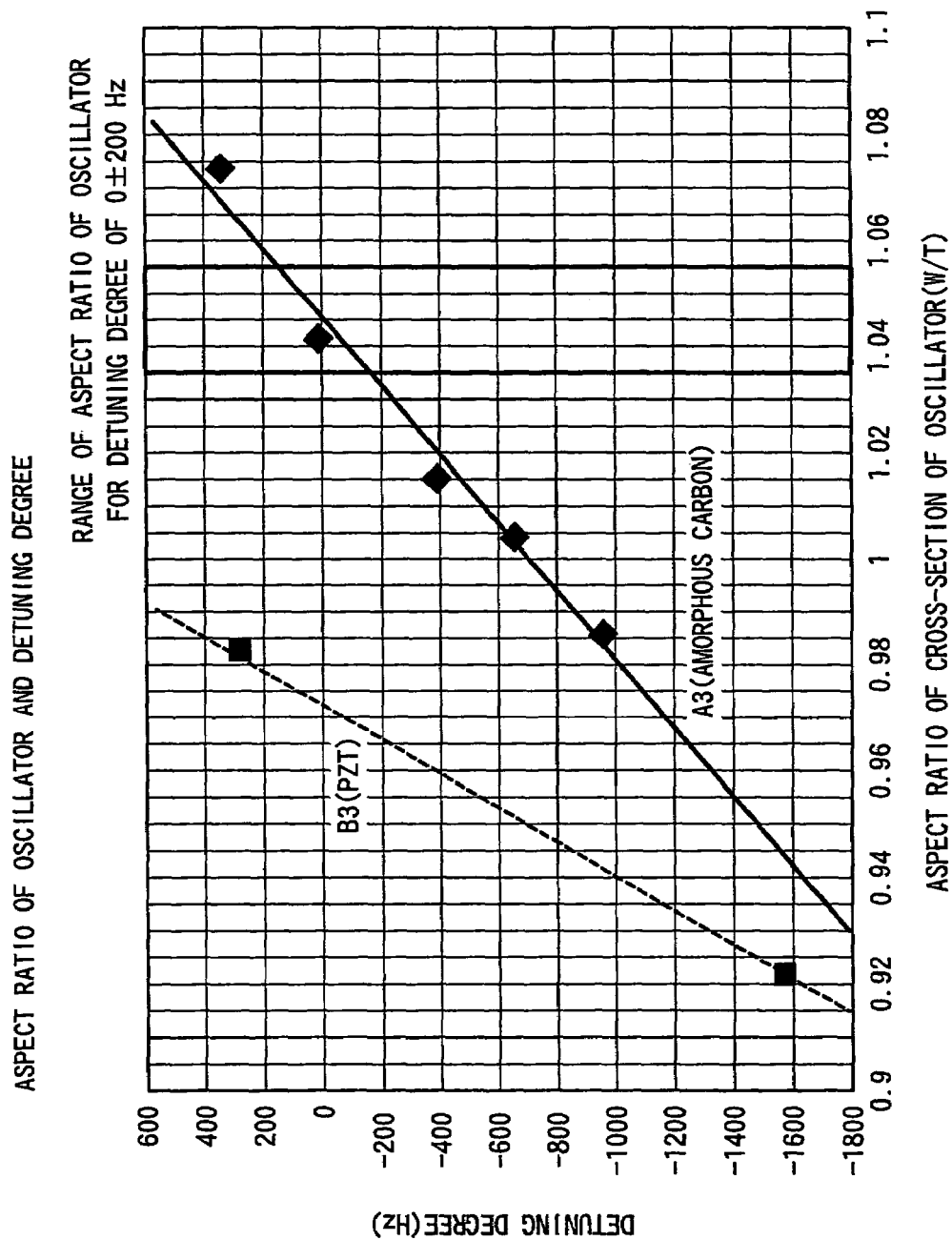
FIG. 12 is a graph showing the relationship between the detuning degree and the aspect ratio of the cross-section of the oscillator in the angular velocity sensor.

FIG. 12 shows the relationship between the detuning degree and the aspect ratio of the cross-section of the oscillator 1a in this angular velocity sensor 1. Meanwhile, the detuning degree means the difference between the resonant frequency in the longitudinal direction and that in the transverse direction. The smaller the detuning degree, the higher becomes the sensitivity.

In FIG. 12, characteristics A3 denote those of the angular velocity sensor 1 in case the substrate 2 is formed of a material (amorphous carbon), having Young's modulus and the thermal expansion coefficient equivalent or less than those of PZT, as a main component of the piezoelectric ceramics making up the piezoelectric member 3, and characteristics A3 denote those in case the substrate 2 is formed of PZT.

With the present angular velocity sensor 1, the detuning degree may be in the vicinity of zero, by setting the ratio of the total width and the thickness, that is, the aspect ratio, of the cross-section of the oscillator 1a, to 1.030 to 1.055, as indicated by a black frame which stands for the range of the aspect ratio of the oscillator 1a for the characteristics A3 corresponding to the detuning degree of 0±200 Hz in FIG. 12. The detuning degree may readily positively adjusted by maintaining this range in the initial state.

Meanwhile, in the present angular velocity sensor 1, detection characteristics may be optimized by differentiating the widthwise electrode dimension W1 for the driving electrode 3b from the width-wise electrode dimension W2 for the detection electrodes 3c1, 3c2, formed on the same plane as that for the driving electrode 3b, as shown in FIG. 13. That is, the driving efficiency may be adjusted by adjusting the shape or the size of the driving electrode 3b, while the detection efficiency may be adjusted by adjusting the shape or the size of the detection electrodes 3c1, 3c2.

Figure 14:
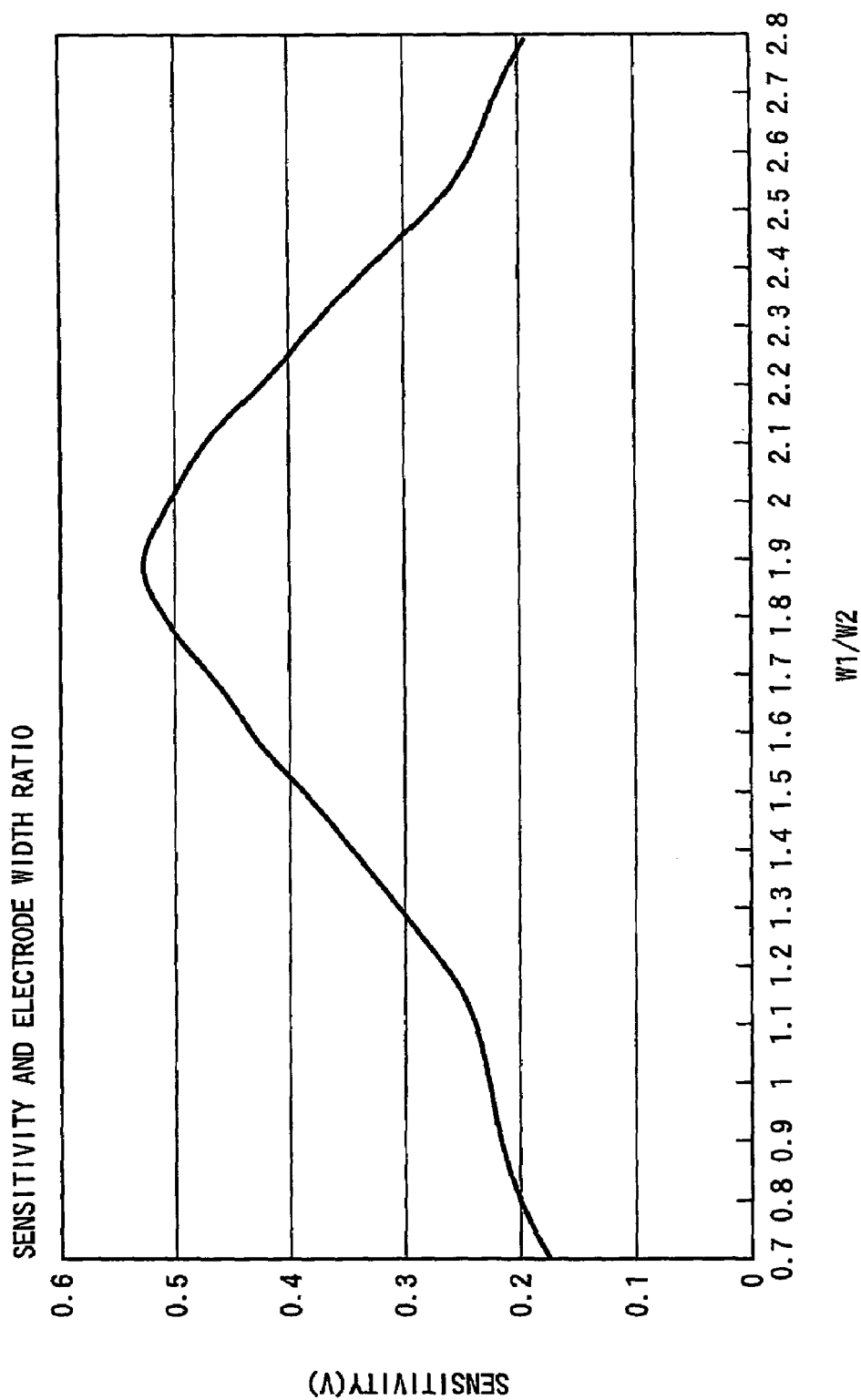
FIG. 14 shows the relationship between the sensitivity and the electrode width ratio in the angular velocity sensor.

FIG. 14 shows the measured results of the sensitivity of the angular velocity sensor 1, when the ratio W1/W2, where W1 is the width of the driving electrode 3b and W2 is the width of the detection electrodes 3c1, 3c2, is changed in a range of 1 to 2.8.

It is seen from sensitivity characteristics, shown in FIG. 14, that the angular velocity sensor 1 exhibits sensitivity for the ratio W1/W2 such that 1<W1/W2≦2.6, which is superior to that for the ratio W1/W2=1, and that, in particular, the angular velocity sensor 1 exhibits sensitivity for the ratio W1/W2 such that 1.8<W1/W2≦2.0, which is twice or more as high as the sensitivity for W1/W2=1.

Figure 15:
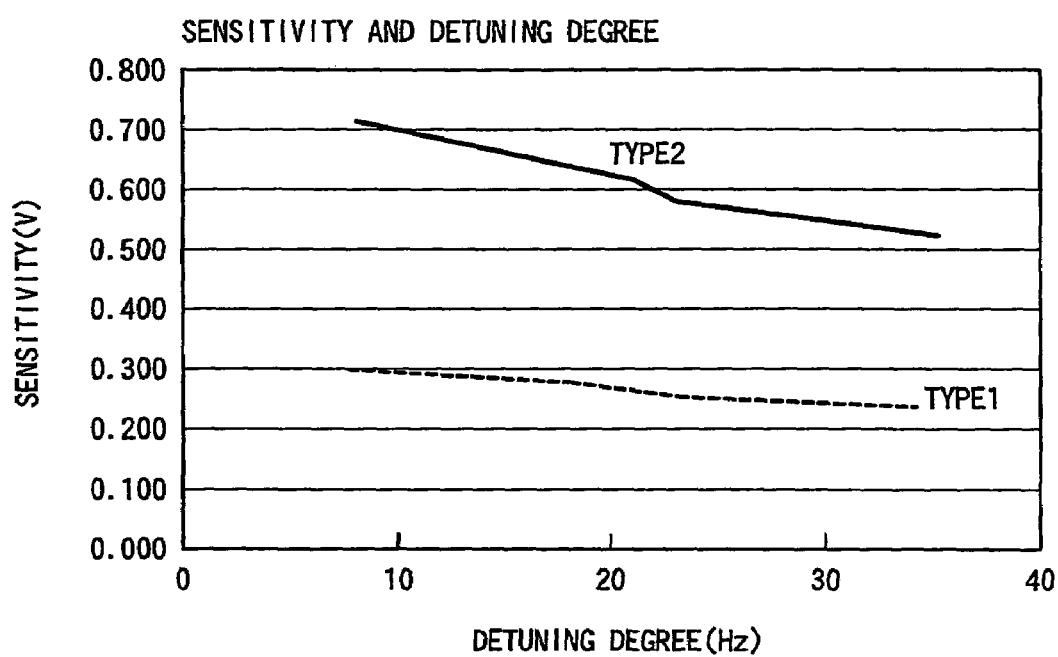
FIG. 15 is a graph showing the relationship between the sensitivity and the detuning degree in the angular velocity sensor.

FIG. 15 shows the relationship between the detuning degree and the sensitivity of the angular velocity sensor 1.

It is noted that the detuning degree means the difference between the resonant frequency along the longitudinal direction and that along the transverse direction and, the smaller the detuning degree, the higher becomes the sensitivity. TYPE 1 stands for a case where W1/W2=1, whilst TYPE 2 stands for a case where W1/W2=1.9. As may be seen form FIG. 15, the sensitivity is preponderantly higher for W1/W2=1.9 than for W1/W2=1, without regard to the prevailing range of the detuning degree.

Figure 16:
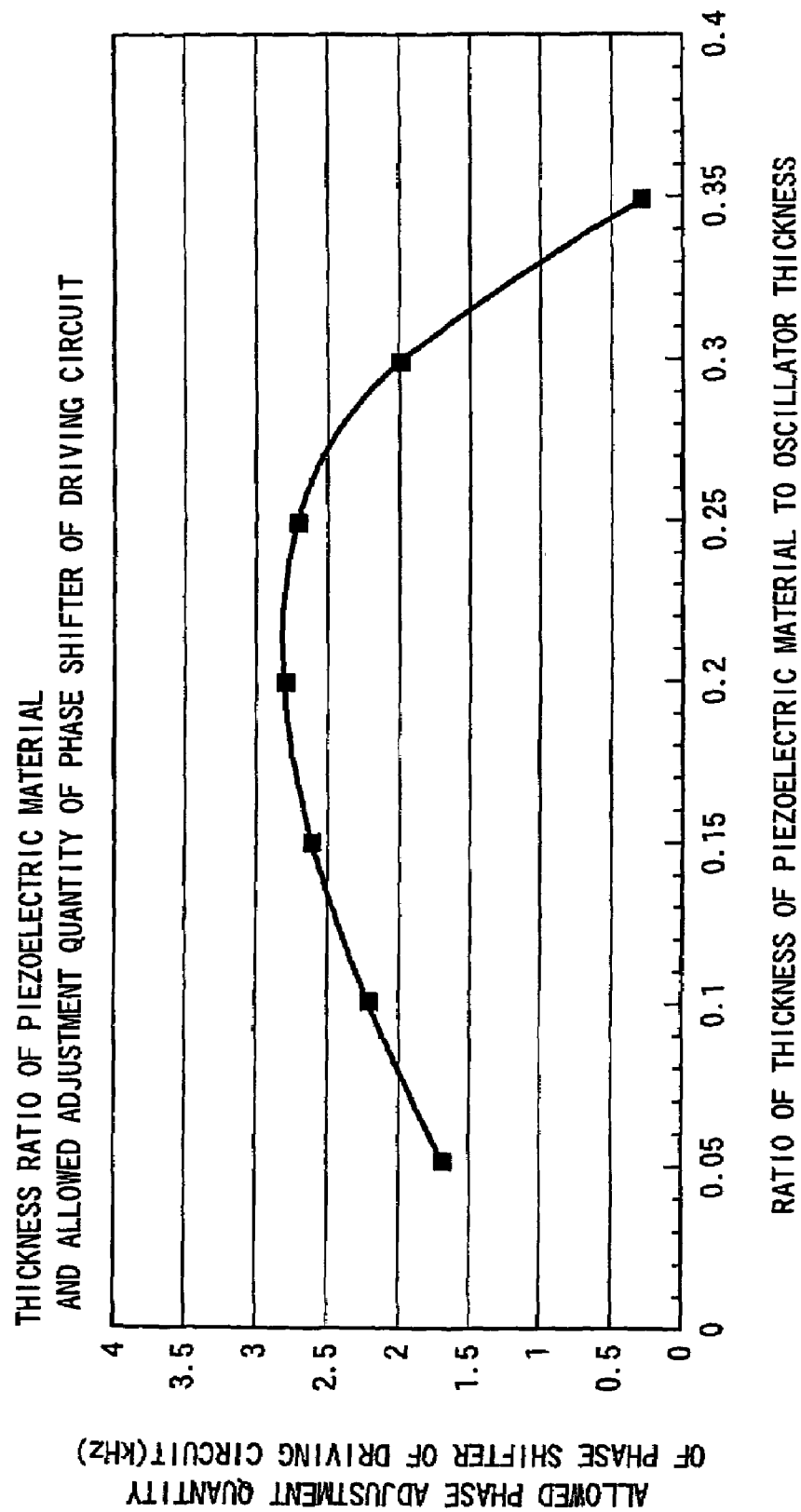
FIG. 16 is a graph showing measured results of the oscillation frequency of the oscillator and the allowed adjustment quantity of a phase shifter of a driving circuit thereof, with the ratio of the thickness of the piezoelectric material in the angular velocity sensor to the thickness of the oscillator being changed.

In the present embodiment of the angular velocity sensor 1, the thickness T1 of the piezoelectric member 3 is thinner than the thickness T1 of the substrate 2 and, as an example, the thickness T1 of the piezoelectric member 3 is set to 0.2 mm and that T2 of the substrate 2 is set to 0.8 mm. The oscillation frequency of the oscillator 1a and the allowed adjustment magnitude of the phase shifter of the driving circuit were measured, as the ratio of the thickness T1 of the piezoelectric member 3 to the thickness T0 of the oscillator 1a was changed, and the results shown in FIG. 16 were obtained. With the above-described structure of the angular velocity sensor 1, the resonant resistance and the oscillation frequency can be compressed to within a preset range, while the phase margin of the driving circuit for self-excited oscillations of the oscillator 1a can be assured, by setting the range of the ratio of the thickness T1 of the piezoelectric member 3 and the thickness T0 of the oscillator to 0.14 to 0.27, more specifically, by setting the thickness T1 of the piezoelectric member 3 to 0.15 mm to 0.25 mm against the thickness T0 of the oscillator 1a of 0.9 mm to 1.1 mm. In addition, adjustment to the preset detuning degree or the oscillation frequency may be facilitated because the degree of frequency changes against dimensional changes of the oscillator 1a may be decreased.

What is claimed is:

1. An angular velocity sensor comprising support means bonded to two nodal points of a pillar-shaped oscillator having a longitudinal direction along which said oscillator extends, which nodal points are generated on oscillations of said oscillator, said support means supporting said nodal points therebetween at upper and lower sides of said oscillator, said support means mechanically supporting and providing for electrical connections to said oscillator, wherein, said support means comprises a plurality of pairs of upper support members and lower support members and each pair of support members with respect to said nodal points include bent parts, said bent parts being bent in the same direction with respect to the longitudinal direction of said oscillator;

said upper support members and lower support members also including arms extending at right angles to an up-and-down direction and to the longitudinal direction of said oscillator and connecting parts for connecting said arms to said oscillator;

said upper support member of a given pair of said upper and lower support members appears superposed over the lower support member of said pair when viewed from said upper side; and said upper support members are larger than said lower support members.

2. The angular velocity sensor according to claim 1 further comprising:

a substrate extending along said longitudinal direction and having an upper major surface;

a reference electrode on the upper major surface of said substrate, said reference electrode being connected to a reference potential;

a piezoelectric member extending along said longitudinal direction and having two oppositely-facing major surfaces, one of which is secured to said reference electrode, said piezoelectric member detecting a Coriolis force generated in said oscillator;

at least one driving electrode formed on the other of said oppositely-facing major surfaces of said piezoelectric member and extending along the longitudinal direction of said oscillator, said driving electrode being supplied with a signal for causing oscillations of said oscillator; and at least one pair of detection electrodes formed parallel to each other on the other of said oppositely-facing major surfaces of said piezoelectric member for sandwiching said driving electrode in-between, said detection electrodes outputting a signal conforming to the Coriolis force generated in said oscillator, wherein, when a voltage is applied across said driving electrode and said reference electrode via said support means, said oscillator is caused to oscillate by said piezoelectric member; an angular velocity detection signal is made available via said detection electrode, which angular velocity detection signal is obtained as a signal conforming to said Coriolis force, via said support means.

3. An angular velocity sensor comprising:

a substrate which extends in a longitudinal direction;

a piezoelectric member extending along said longitudinal direction and having two oppositely-facing major surfaces;

a pair of detection electrodes extending along lateral edges of one surface of the piezoelectric member;

a driving electrode positioned and extending laterally between the two detecting electrodes on the one surface of the piezoelectric member;

first upper supporting members coupled to nodal points along said detecting electrodes by means of serpentine-shape members having bends that extend along the longitudinal direction of the substrate;

second upper supporting members coupled to said driving electrode by means of serpentine-shape members having bends that extend along the longitudinal direction of the substrate;

first lower supporting members coupled to nodal points along said substrate on a surface opposite said detecting electrodes by means of serpentine-shape members having bends that extend along the longitudinal direction of the substrate, said first lower supporting members operating in conjunction with said first upper supporting members to support said substrate therebetween; and second lower supporting members coupled to nodal points along said substrate on a surface opposite said detecting electrodes by means of serpentine-shape members having bends that extend along the longitudinal direction of the substrate, said second lower supporting member operating in conjunction with said second upper supporting members to support said substrate therebetween, wherein, said serpentine-shape bends of a given upper supporting member and its corresponding lower supporting bend in the same direction relative to longitudinal direction when viewed from the same direction, some upper support members are connected to said driving electrode but not said detecting electrodes and some of said upper support members are connected to said detecting electrodes but not said driving electrode, and said upper support members are larger than said lower support members.

* * * * *